UNITED STATES PATENT OFFICE.

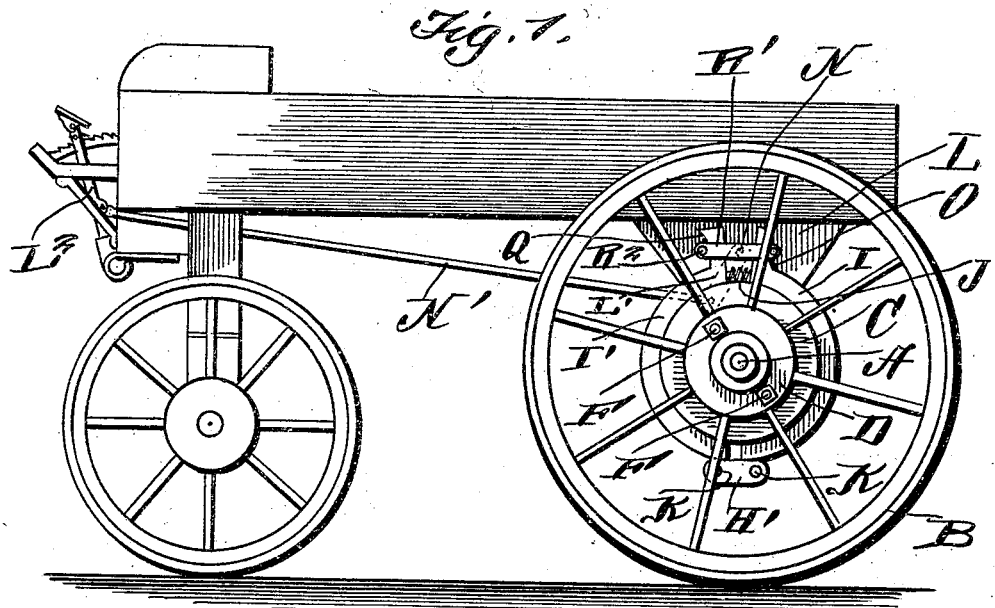
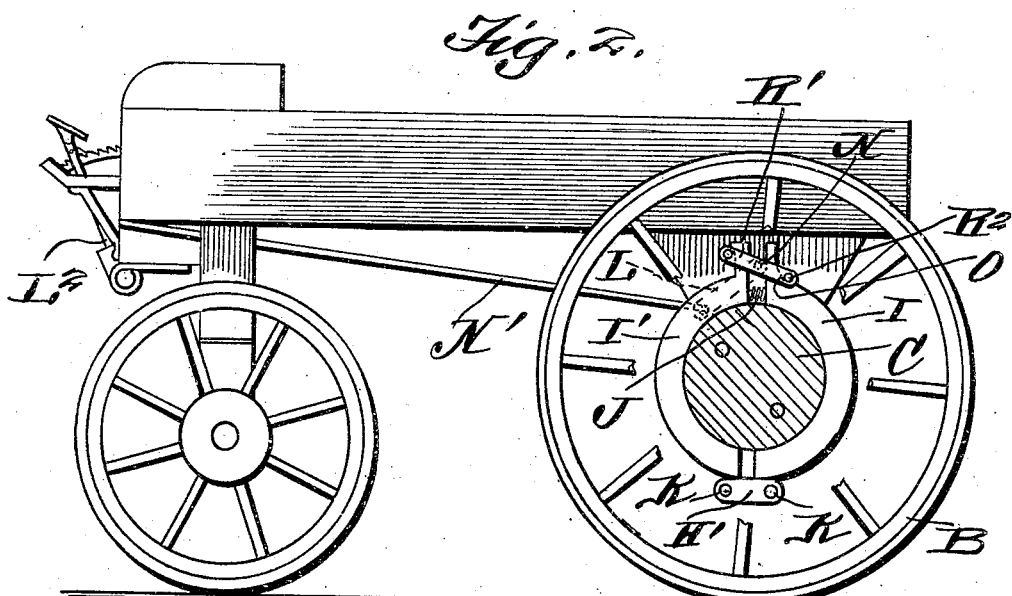

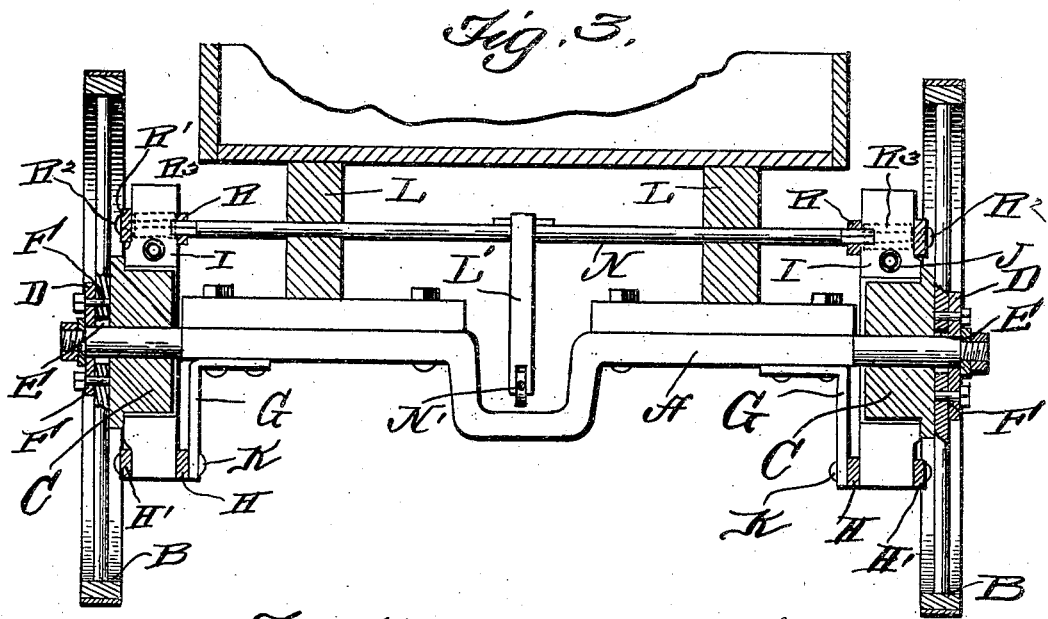

JOSEPH AUTH AND HENRY KETTLER, OF COVINGTON, KENTUCKY.

WAGON-BRAKE.

938,810.

Specification of Letters Patent.   Patented Nov. 2, 1909.

Application filed June 29, 1909.   Serial No. 505,054.

*To all whom it may concern:*

Be it known that we, JOSEPH AUTH and HENRY KETTLER, citizens of the United States, residing at Covington, in the county of Kenton and State of Kentucky, have invented certain new and useful Improvements in Wagon-Brakes; and we do hereby declare the following to be a full, clear, and exact description of the invention, such as will enable others skilled in the art to which it appertains to make and use the same, reference being had to the accompanying drawings, and to the letters and figures of reference marks thereon, which form a part of this specification.

This invention relates to new and useful improvements in brakes for vehicle wheels and comprises a simple and efficient device having various details of construction, combinations and arrangements of parts which will be hereinafter fully described and then specifically defined in the appended claims.

We illustrate our invention in the accompanying drawings, in which:—

Figure 1 is a side elevation of a wagon showing our improved brake as applied thereto. Fig. 2 is a sectional view showing parts in elevation. Fig. 3 is a cross sectional view through two of the wheels, parts being shown in elevation. Fig. 4 is an enlarged sectional view showing the brake shoes thrown at their farthest limits from each other, and Fig. 5 is a similar view showing the brakes set.

Reference now being had to the details of the drawings by characters, A designates the rear axle of a vehicle upon the contracted end of which is journaled a wheel B. Fixed to said axle are the friction disks C, C and D, D are disks which are fastened to the hubs E, E of the wheels and are held together by means of bolts F, the spokes of the wheels being clamped intermediate said disks C and D. Fastened to the rear axle are the angle bars G, each of which has fastened thereto a plate H. Friction shoes, designated by letters I and I', are pivotally mounted upon the pins K which are mounted between the two links H and H' and are concaved and adapted to conform to and bear against the circumference of the friction disk C when the brakes are applied. One of said brake shoes has an outwardly inclined surface O and the other shoe of each pair is provided with an oppositely inclined edge Q and a spring J is interposed between the parallel portions of the brake shoes and adapted to normally hold the same apart.

Journaled in suitable bearings in the bolster L is a rock shaft N projecting from which is a bar L' to which a chain or rod N' is connected which, in Figs. 1 and 2, is shown as attached to a foot lever L², forming convenient means whereby the brake may be applied. Said rock shaft N has a plate R fixed thereto and adapted to rock with the shaft and a second plate R' is held to the plate R by means of bolts R² and caused to rock therewith. Mounted upon each of the bolts R² is a roller R³, one of which is adapted to bear against the inclined edge O upon a brake shoe I while the other roller is adapted to bear against an inclined edge Q upon the brake shoe I', thus causing the two brake shoes, as the shaft L is rocked, to move toward and frictionally engage the circumference of the disk C. When the pressure is relieved from the brake shoes, the spring will return the brake shoes to their normal positions out of engagement with the disk.

From the foregoing it will be noted that, by the provision of a brake and shoes embodying the features of our invention, a simple and efficient mechanism is afforded whereby, with a slight pressure applied to the operating lever, the two brake shoes may be thrown into contact with the friction disk with such force as to hold the wheel from turning and, when pressure is relieved from the brake shoes, the springs will throw the same out of engagement with the friction disk.

While we have shown our brake as applied to a particular form of running gear, it will be understood that we do not restrict ourselves to any particular detailed manner of attaching the brake and it will be understood that the same will be applied to various forms of vehicle wheels without in any way departing from the spirit of the invention.

What we claim to be new is:—

1. A brake for vehicle wheels comprising, in combination with a running gear and vehicle wheel, a friction disk rotating therewith, friction shoes mounted upon the running gear of a vehicle, said shoes having inclined edges which are parallel with each other, a rock shaft, bars secured thereto, rollers journaled between said bars and adapted to bear one against each inclined edge of the shoe and adapted to move the shoes toward each other, and a spring for returning the shoes to their normal positions.

2. A brake for vehicle wheels comprising, in combination with a running gear and vehicle wheel, a friction disk rotating with the latter, friction shoes pivoted together and having their ends which extend upwardly provided each with an inclined edge which are parallel to each other, a rock shaft journaled in suitable bearings in the running gear, bars secured to said rock shaft, rollers journaled intermediate said bars and adapted to be thrown in contact with one of said inclined edges as the shaft is rocked in one direction, and a spring for returning the shoes to their normal positions.

3. A brake for vehicle wheels comprising, in combination with a running gear and vehicle wheel, a friction disk rotating therewith, friction brake shoes, links pivotally connecting said brake shoes, the upper ends of said brake shoes having their outer edges inclined, a rock shaft journaled in the running gear, plates fixed to rock with said shaft, rollers journaled between the plates and adapted to engage each of said inclined edges, and means for rocking the shaft.

4. A brake for vehicle wheels comprising, in combination with a running gear and vehicle wheel, a friction disk rotating therewith, angled bars fastened to the axle of the running gear, links fastened to said bars, brake shoes pivotally connected to said links, the free ends of said brake shoes having their outer edges inclined, a rock shaft journaled in the running gear, plates secured to said rock shaft, rollers journaled intermediate said plates and adapted to bear against said inclined edges, and means for rocking said shaft.

In testimony whereof we hereunto affix our signatures in the presence of two witnesses.

JOSEPH AUTH.
HENRY KETTLER.

Witnesses:
B. F. GRYRAIN,
L. J. REYNOLDS.